(12) United States Patent
Matsumoto et al.

(10) Patent No.: US 8,773,385 B2
(45) Date of Patent: Jul. 8, 2014

(54) TOUCH PANEL

(75) Inventors: Kenichi Matsumoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 93 days.

(21) Appl. No.: 13/589,594

(22) Filed: Aug. 20, 2012

(65) Prior Publication Data
US 2013/0057486 A1 Mar. 7, 2013

(30) Foreign Application Priority Data

Sep. 5, 2011 (JP) ................. 2011-192668

(51) Int. Cl.
*G06F 3/041* (2006.01)
*H05K 1/00* (2006.01)

(52) U.S. Cl.
USPC ............... 345/173; 178/18.03; 178/18.05; 178/18.06; 174/250; 345/174

(58) Field of Classification Search
CPC ............................. G06F 2203/04111
USPC ............ 345/156, 173–179; 178/18.01–19.07; 174/250

See application file for complete search history.

(56) References Cited

U.S. PATENT DOCUMENTS

| 7,438,978 B2 * | 10/2008 | Kotsubo et al. | 428/483 |
| 2009/0091549 A1 | 4/2009 | Matsumoto et al. | |
| 2011/0157038 A1 * | 6/2011 | Feng | 345/173 |

FOREIGN PATENT DOCUMENTS

JP 2009-093397 A 4/2009

* cited by examiner

*Primary Examiner* — Lun-Yi Lao
*Assistant Examiner* — Jarurat Suteerawongsa
(74) *Attorney, Agent, or Firm* — McDermott Will & Emery LLP

(57) ABSTRACT

A touch panel includes an upper substrate, upper conductive layers on an upper surface of the upper substrate, a lower substrate having an upper surface facing a lower surface of the upper substrate, lower conductive layers provided on the upper surface of the lower substrate, and an adhesive layer bonding the lower surface of the upper substrate to the upper surface of the lower substrate. The adhesive layer is curable with ultraviolet ray. This touch panel prevents adhesive from being attached and having a pressing mark, thus being operated easily.

4 Claims, 3 Drawing Sheets

TOUCH PANEL

FIELD OF THE INVENTION

The present invention relates to a touch panel used for operating a range of electronic devices.

BACKGROUND OF THE INVENTION

In recent years, a range of electronic devices, including mobile phones and electronic cameras, are becoming more sophisticated and diversified. There are increasingly more electronic devices equipped with a light-transmissive touch panel attached to a front surface of a display element such as liquid crystal. Diversifying functions of an electronic device is switched over as the user operates the touch panel typically by finger while looking at indication of display element at the back via this touch panel. Therefore, the user demands touch panels that can be easily and reliably operated.

FIG. 3 is an exploded perspective view of conventional touch panel 500. Plural strip-like light-transmissive upper conductive layers 502 made of indium tin oxide are arranged on an upper surface of film-like light-transmissive upper substrate 501 in a front-back direction. Plural upper electrodes 503 made of copper foils are connected to front ends or back ends of upper conductive layers 502. An end of each upper electrode 503 is led out to a right peripheral end of upper substrate 501. Plural upper electrodes 503 extend in a left-right direction perpendicular to upper conductive layers 502.

Plural strip-like light-transmissive lower conductive layers 505 made of indium tin oxide are arranged on an upper surface of film-like light-transmissive lower substrate 504. Plural lower conductive layers 505 are arranged in the left-right direction perpendicular to upper conductive layers 502. Plural lower electrodes 506 made of copper foils are connected to right ends of lower conductive layers 505. An end of each of lower electrodes 506 is led out to a right peripheral end of lower substrate 504. Lower electrodes 506 extend in the left-right direction parallel to lower conductive layers 505.

Cover 507 is light transmissive and is made of insulating material, such as glass or polycarbonate. Upper substrate 501 is laid over the upper surface of lower substrate 504, and cover 507 is laid over the upper surface of upper substrate 501. Lower substrate 504, upper substrate 501, and cover 507 are adhered to each other by adhesive layer 508 made of, e.g. acryl or rubber, formed on the upper surfaces of upper substrate 501 and lower substrate 504, providing touch panel 500.

Touch panel 500 is disposed on a front surface of a display element, such as a liquid crystal device, and installed in an electronic device. The ends of upper electrodes 503 and lower electrode 506 led out to the right peripheral end are electrically connected to an electronic circuit of the device via a flexible wiring board and a connector.

While a voltage is applied from the electronic circuit sequentially to upper electrodes 503 and lower electrodes 506, a user operates the electronic device by touching the upper surface of cover 507 typically by a finger, depending on an indication of display element on a back surface of the touch panel. The electronic circuit detects a point of operation based on the change of a capacitance between upper conductive layer 502 and lower conductive layer 505 at a point where the user operates, and switches functions of the electronic device.

For example, while menus are displayed on the display element at the back surface, the user touches the upper surface of cover 507 typically with a finger over a desired menu. This operation causes a charge to move to the finger, and changes a capacitance between upper conductive layer 502 and lower conductive layer 505 at the point where touch panel 100 is operated. The electronic circuit detects this change of the capacitance, and selects the desired menu.

A conventional touch panel similar to touch panel 500 is disclosed in Japanese Patent Laid-pen Publication No.2009-93397.

In touch panel 500, adhesive layer 508 easily protrudes from the outer periphery of upper substrate 501 or lower substrate 504. The protruding adhesive may be attached to other part and cause stain. Or, when the upper surface of cover 507 is pressed hard typically with the finger, adhesive layer 508 at this pressed point may dent and have a pressing mark therein.

SUMMARY OF THE INVENTION

A touch panel includes an upper substrate, upper conductive layers on an upper surface of the upper substrate, a lower substrate having an upper surface facing a lower surface of the upper substrate, lower conductive layers provided on the upper surface of the lower substrate, and an adhesive layer bonding the lower surface of the upper substrate to the upper surface of the lower substrate. The adhesive layer is curable with ultraviolet ray.

This touch panel prevents adhesive from being attached and having a pressing mark, thus being operated easily.

DETAIL DESCRIPTION OF PREFERRED EMBODIMENTS

Figure 1:
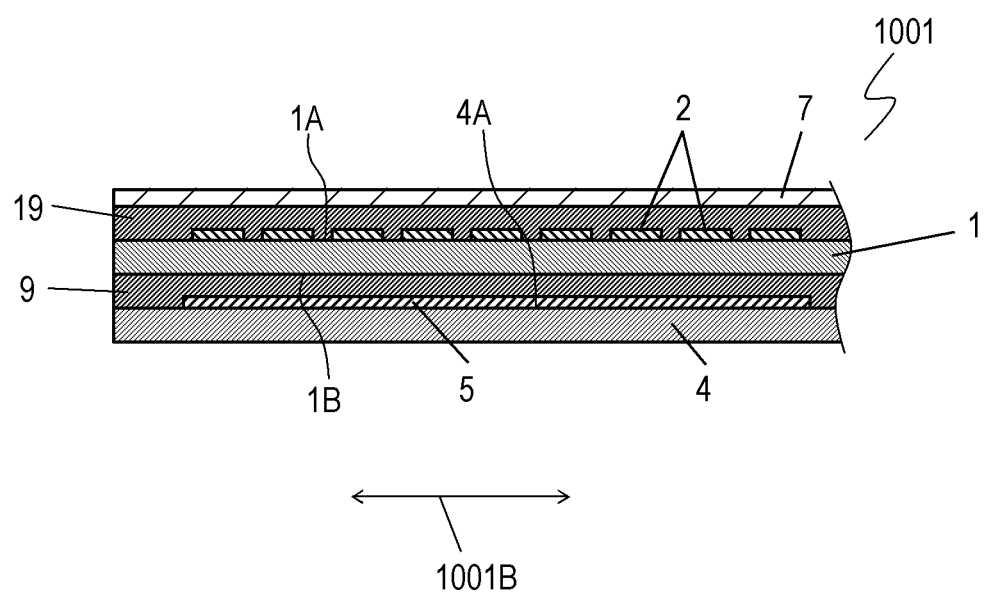
FIG. 1 is a sectional view of a touch panel in accordance with an exemplary embodiment of the present invention.
Figure 2:
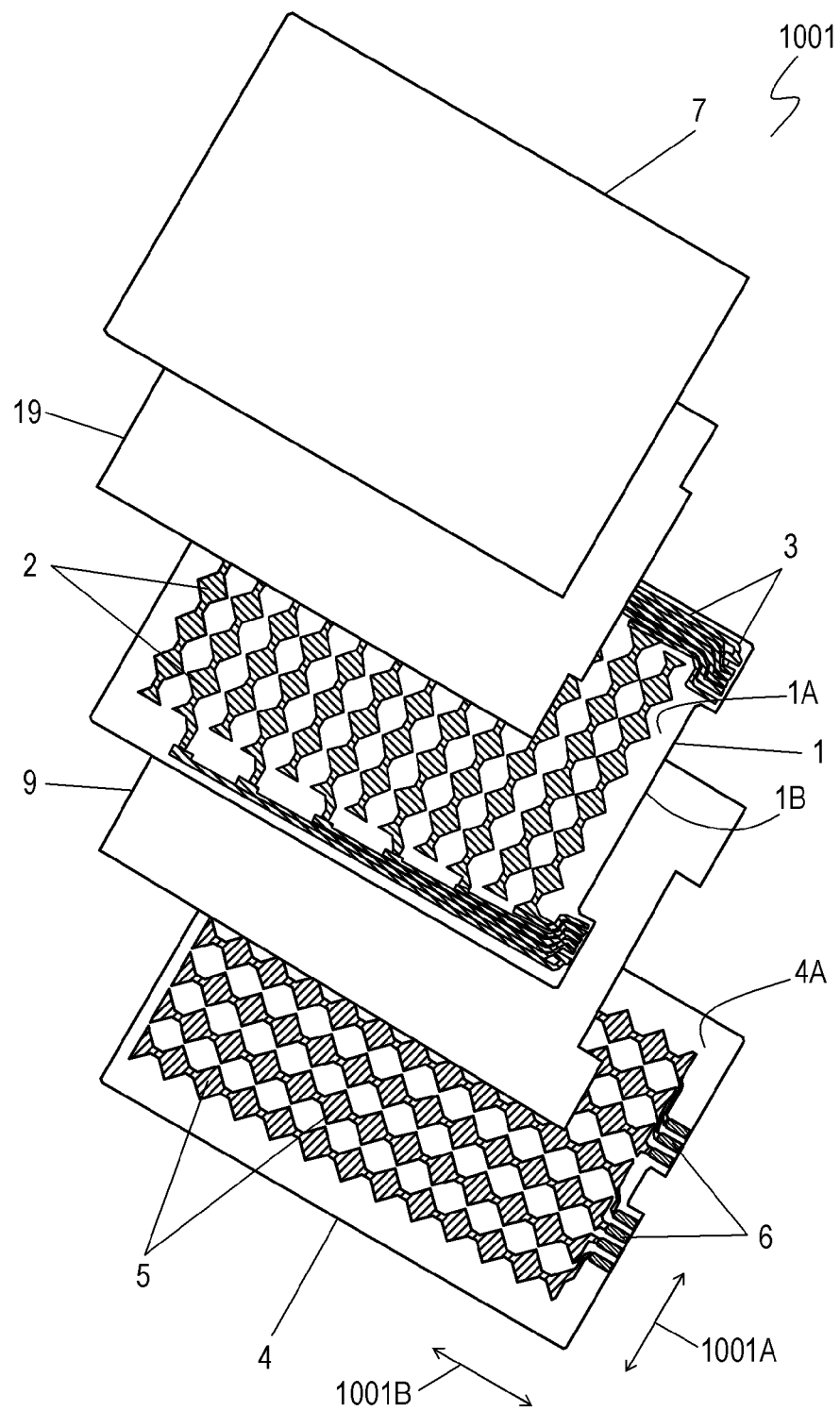
FIG. 2 is an exploded perspective view of the touch panel in accordance with the embodiment.

FIGS. 1 and 2 are a sectional view and an exploded perspective view of touch panel 101 according to an exemplary embodiment of the present invention, respectively. Upper substrate 1 has a film shape and made of a light-transmissive material, such as polyethylene terephthalate, polyether sulfone, or polycarbonate. Plural upper conductive layers 2 are provided on upper surface 1A of upper substrate 1. Upper conductive layers 2 are made of light-transmissive conductive material, such as indium tin oxide or tin oxide, and are formed by, e.g. sputtering. Plural upper conductive layers 2 have a strip shape extending in predetermined direction 1001A, a right-left direction in the figures, and are arranged in direction 1001B, a front-back direction in the figures, perpendicular to direction 1001A.

Plural upper electrodes 3 disposed on upper surface 1A of upper substrate 1 are connected at a front end or back end of upper conductive layers, respectively. A copper foil is laid on the indium tin oxide typically by deposition. The ends of upper electrodes 3 are led out to a right end of upper substrate 1. Upper electrodes 3 extend in direction 1001B.

Lower substrate 4 is made of the same material and has the same shape as upper substrate 1. Plural lower conductive layers 5 made of light-transmissive conductive material, such as indium tin oxide, are provided on upper surface 4A of lower substrate 4. Lower conductive layers 5 have strip shapes extending in direction 1001B, and are arranged in direction 1001A.

Plural lower electrodes 6 provided on upper surface 4A of lower substrate 4 are connected to the right ends of lower conductive layers 5, respectively. Lower electrodes 6 are made of the same material by the same method as upper electrodes 3. Ends of lower electrodes 6 are led out to the right end of lower substrate 4. Lower electrodes 6 extend in direction 1001b in parallel to lower conductive layers 5.

Each of upper conductive layers 2 and lower conductive layers 5 includes plural square portions connected to each other. Plural upper space portions from which upper surface 1A of upper substrate 1 is exposed are provided between the square portions of upper conductive layers 2. The upper space portions have substantially square shapes. Similarly, plural lower space portions from which upper surface 4A of lower substrate 4 is exposed are provided between the square portions of lower conductive layers 5. The lower space portions have substantially square shapes. While upper substrate 1 is laid over lower substrate 4, the square portions of upper conductive layers 2 are positioned over the lower space portions of lower conductive layers 5, and the square portions of lower conductive layers 5 are positioned below the upper space portions of upper conductive layers 2.

Cover 7 is made of light-transmissive insulating material, such as glass or polycarbonate. Upper substrate 1 is laid over upper surface 4A of lower substrate 4 via adhesive layer 9 while cover 7 is laid over upper surface 1A of upper substrate 1 via adhesive layer 19. Adhesive layers 9 and 19 are made of adhesive agent curable with ultraviolet ray. Lower substrate 4, upper substrate 1, and cover 7 are adhered with adhesive layers 9 and 19, thereby providing touch panel 1001. Upper surface 4A of lower substrate 4 faces lower surface 1B of upper substrate 1 via adhesive layer 9.

More specifically, in touch panel 1001 according to the embodiment, upper conductive layers 2 arranged in direction 1001B face lower conductive layers 5 arranged in direction 1001A with a predetermined gap in between via upper substrate 1 and adhesive layer 9.

A method of manufacturing touch panel 1001 will be described below.

First, a thin film of light-transmissive conductive material, such as indium tin oxide, is formed entirely on upper surface 1A of upper substrate 1 and entirely on upper surface 4A of lower substrate 4 by, e.g. sputtering. Then, a thin copper foil film is formed entirely on an upper surface of this thin film by, e.g. sputtering.

Next, portions where upper electrodes 3 and lower electrodes 6 are formed on the upper surface of this thin copper foil film are masked with an insulating resin film, such as a dry film, by exposure and development typically using a photo resist method. Then, upper substrate 1 and lower substrate 4 are immersed in a predetermined etching solution to dissolve and remove copper from undesired portions. Upper electrodes 3 and lower electrodes 6 made of copper foils are formed on the upper surface of the thin film typically of indium tin oxide.

Then, portions where upper conductive layers 2 and lower conductive layers 5 are formed on the upper surface of the thin film typically of indium tin oxide are also masked. Upper substrate 1 and lower substrate 4 are immersed in a predetermined etching solution to dissolve and remove indium tin oxide from undesired portions. Thus, upper conductive layers 2, lower conductive layers 5, upper electrodes 3, and lower electrodes 6 are formed on upper surfaces 1A and 4A of upper substrate 1 and lower substrate 4.

A adhesive agent is obtained by partially mixing a photo-crosslinkable functional group, such as acrylate or methacrylate; with a molecular frame, such as acryl, styrene, or butadiene rubber; and also compounding photoreactive monomer, such as acrylate or methacrylate; photopolymerization initiator, such as oligomer or 4-methylbenzophenon; and hardening accelerator, such as ethyl-4-dimethyl amino benzoate. Dilution, such as cyclohexane or methyl ethyl ketone, is mixed with the adhesive agent, and applied to a sheet. The dilution is evaporated, and the adhesive agent is dried to form adhesive layers 9 and 19. At this moment, adhesive layers 9 and 19 have elastic shear modulus ranging from $5 \times 10^2$ Pa to $5 \times 10^4$ Pa.

Lower substrate 4 and upper substrate 1 are bonded with adhesive layer 9. Upper substrate 1 and cover 7 are bonded with adhesive layer 19. Then, ultraviolet rays are irradiated to adhesive layers 9 and 19 to cure these layers to obtain touch panel 1001. Cured adhesive layers 9 and 19 have elastic shear modulus ranging from $5 \times 10^4$ Pa to $5 \times 10^6$ Pa.

Touch panel 1001 is disposed on a front surface of a display element, such as liquid crystal display device, and installed in an electronic device. Ends of multiple upper electrodes 3 and lower electrodes 6 led out to the right ends of upper substrate 1 and lower substrate 4 are electrically connected to an electronic circuit of the device via a flexible wiring board and connector.

A user touches the upper surface of cover 7 with a finger to operate depending on an indication on the display element on a back surface of touch panel 1001 while a voltage is applied sequentially to upper electrodes 3 and lower electrodes 6 from the electronic circuit. A capacitance between upper conductive layers 2 and lower conductive layers 5 locally changes under the touched point. The electronic circuit detects the touched point based on this change, and switches functions of the device.

For example, while plural menus are displayed on the display element on the back surface, the user touches the upper surface of cover 7 with a finger to select a desired menu. This operation causes a charge to move to the finger, and locally changes a capacitance between upper conductive layers 2 and lower conductive layers 5 under a point where cover 7 is touched. The electronic circuit detects this change, and selects the desired menu.

Figure 3:
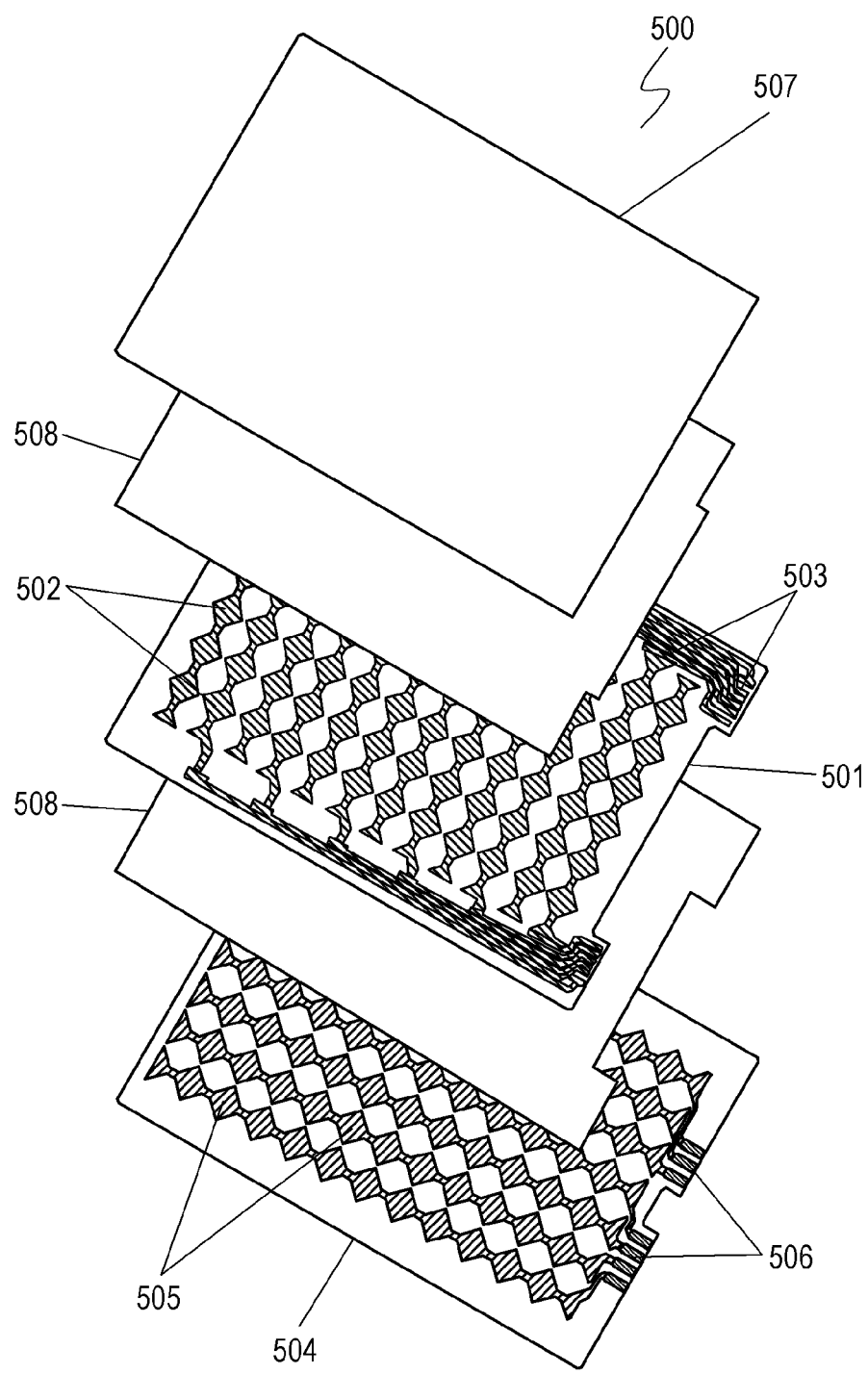
FIG. 3 is an exploded perspective view of a conventional touch panel.

In conventional touch panel 500 shown in FIG. 3, adhesive layer 508 provided on the upper surfaces of upper substrate 501 and lower substrate 504 is made of soft thermosetting material, such as acryl or rubber. Accordingly, adhesive layer 508 easily protrudes from the periphery of upper substrate 501 or lower substrate 504, and the protruding adhesive may be attached to other part and cause stain. Or, if the upper surface of cover 507 is pressed hard with the finger, adhesive layer 508 at this point may dent and create a pressing mark.

Since cover 7, upper substrate 1, and lower substrate 4 are bonded with ultraviolet-curable adhesive layers 9 and 19, adhesive layers 9 and 19 are prevented from protruding the periphery of upper substrate 1 or lower substrate 4 and being attached to other part. In addition, even if the upper surface of cover 7 is pressed hard with the finger, the pressing mark due to a dent in adhesive layers 9 and 19 at this point can not be produced.

In other words, after bonding cover 7, upper substrate 1, and lower substrate 4 with adhesive layers 9 or 19 having shear elastic modulus ranging from $5 \times 10^2$ Pa to $5 \times 10^4$ Pa before curing, the shear elastic modulus of adhesive layers 9 and 19 increases to a range from $5 \times 10^4$ Pa to $5 \times 10^6$ Pa by irradiating ultraviolet ray. Accordingly, the adhesive layers are prevented from protruding from the periphery of upper substrate 1 or lower substrate 4 and from being attached to other part. In addition, a pressing mark is unlikely created. Touch panel 1001 can thus be easily operated.

According to the embodiment, terms, such as "upper" and " lower", indicating directions indicate relative directions depending only on relative positional relationship of components, such as upper substrate 1 and lower substrate 4 of touch panel 1001, and do not indicate absolute directions, such as a vertical direction.

What is claimed is:

1. A touch panel comprising:
    an upper substrate;
    a plurality of upper conductive layers provided on an upper surface of the upper substrate, the upper conductive layers having substantially strip shapes extending in a predetermined direction;
    a lower substrate;
    a plurality of lower conductive layers provided on an upper surface of the lower substrate, the lower conductive layers having substantially strip shapes extending in a direction perpendicular to the predetermined direction; and
    a first adhesive layer provided between a lower surface of the upper substrate and the upper surface of the lower substrate, the first adhesive layer bonding the lower surface of the upper substrate to the upper surface of the lower substrate, wherein:
    the first adhesive layer is made of a first adhesive agent which is cured, the first adhesive agent being curable with ultraviolet ray, and
    the first adhesive agent which is cured has an elastic shear modulus ranging from $5 \times 10^4$ Pa to $5 \times 10^6$ Pa.

2. The touch panel of claim 1, further comprising:
    a light-transmissive cover; and
    a second adhesive layer provided between a lower surface of the cover and the upper surface of the upper substrate, the second adhesive layer bonding the lower surface of the cover to the upper surface of the upper substrate.

3. The touch panel of claim 2, wherein:
    the second adhesive layer is made of a second adhesive agent which is cured, the second adhesive agent being curable with ultraviolet ray, and
    the second adhesive agent which is cured has an elastic shear modulus ranging from $5 \times 10^4$ Pa to $5 \times 10^6$ Pa.

4. The touch panel of claim 1, wherein the plurality of upper conductive layers and the plurality of lower conductive layers stack on each other via the upper substrate and the first adhesive layer.

* * * * *